Oct. 11, 1960    E. I. MOSER    2,955,612
PRESSURE ACTUATED VALVE
Filed Sept. 9, 1955    2 Sheets-Sheet 2

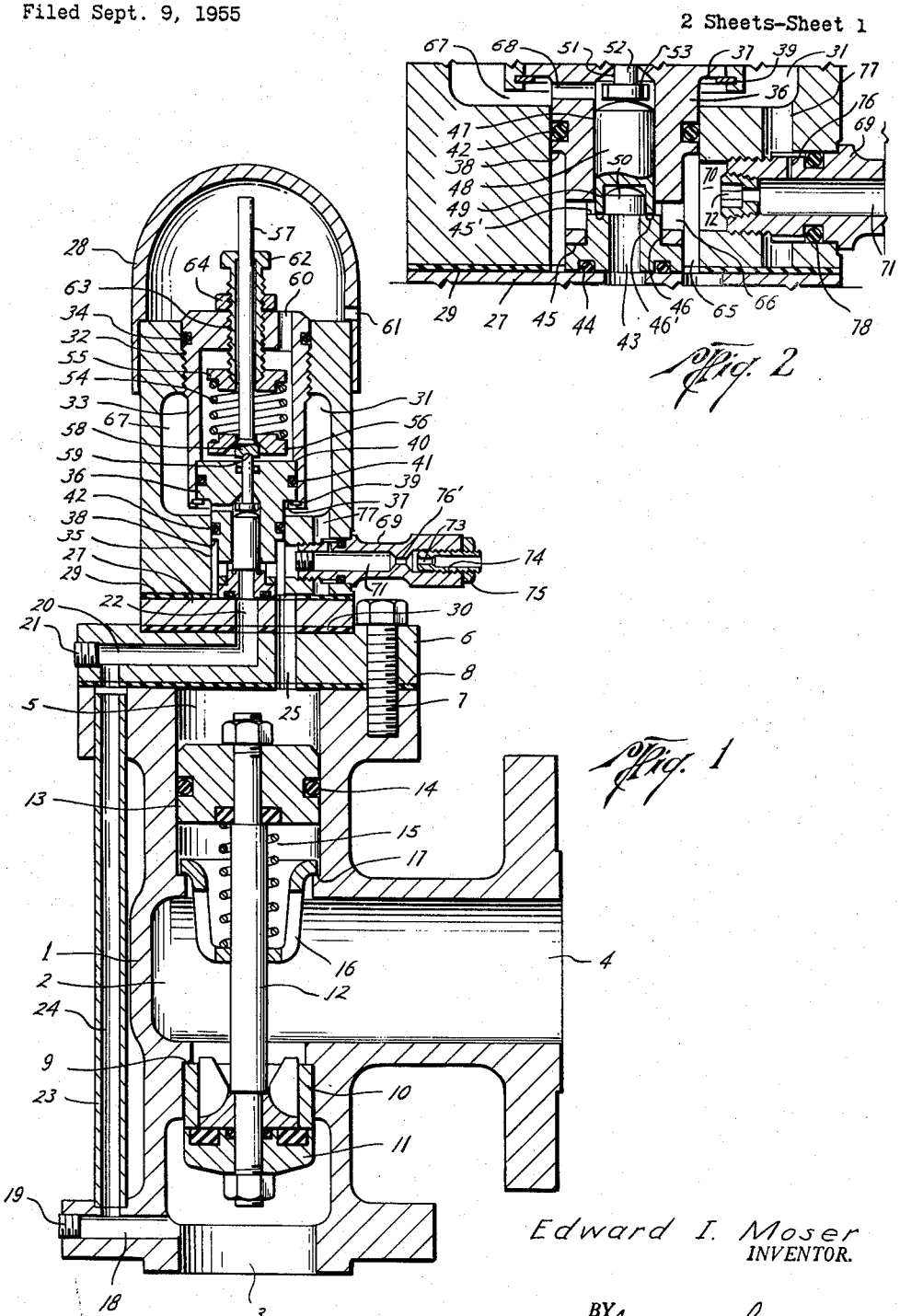

Edward I. Moser
INVENTOR.

BY Charles E. Lightfoot
ATTORNEY

United States Patent Office 2,955,612
Patented Oct. 11, 1960

2,955,612

PRESSURE ACTUATED VALVE

Edward I. Moser, Houston, Tex., assignor to Kinzbach Tool Company, Incorporated, Houston, Tex., a corporation of Texas Filed Sept. 9, 1955, Ser. No. 533,343

4 Claims. (Cl. 137—489.5)

The invention relates to a pressure actuated valve, and it relates more particularly to a pressure actuated valve, for use with gases or vapors, which is especially adapted for use as a pilot valve in the operation of a larger safety or relief valve.

It is an object of the invention to provide a pressure sensitive valve which can be set to open fully at a predetermined line pressure and to close fully at a predetermined line pressure.

Another object of the invention is to provide a valve of the type described in which the opening and closing pressures may be adjusted to produce either a large differential or a relatively small differential.

Another object of the invention is to provide a valve which may be used to operate one or more pressure actuated devices, and which operates efficiently in the manner described even when the delivered pressure is substantially equal to the line pressure.

The invention will be readily understood by referring to the following description and the accompanying drawing in which:

Fig. 1 is a sectional elevational view of a typical pressure operated device having incorporated therein a pilot valve embodying the invention, showing the valve and pressure operated device in closed position;

Fig. 2 is a fragmentary view on an enlarged scale, showing a portion of the apparatus illustrated in Fig. 1.

Figure 3:
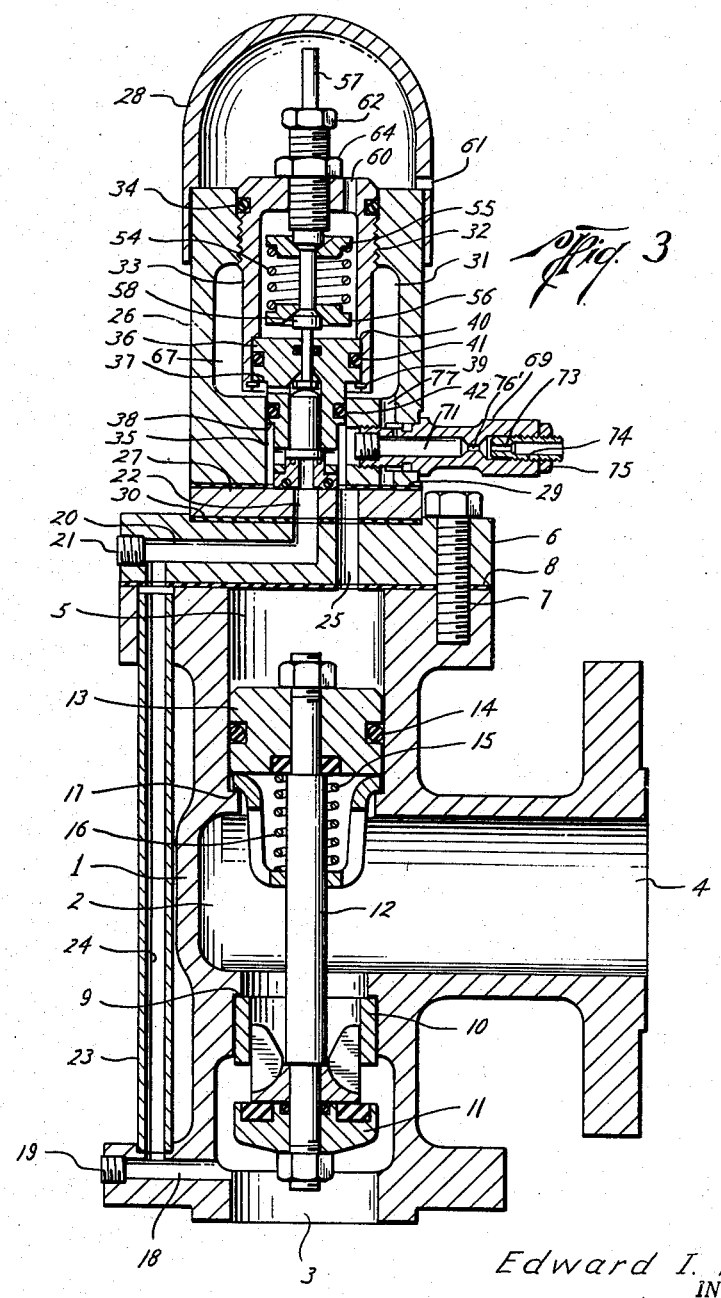
Fig. 3 is a view similar to Fig. 1, showing the valve in open position.

Referring to the drawing, a pressure actuated valve is shown which comprises a T-shaped body member 1 having an internal cavity 2, a bottom inlet 3, a side outlet 4 and a top opening 5. The openings 3, 4 and 5 each comprise an internal bore communicating at its inner end with the internal cavity 2. The body member 1 is flanged at the outer ends of the bores 3, 4 and 5. The bores comprising the bottom inlet 3 and the top opening 5 are aligned concentrically with each other. A cover plate 6, which forms a closure for the top opening 5, is removably connected to the flanged upper end of the body member 1 by a plurality of fastening devices such as the cap screw 7. A gasket 8 is disposed between the body member 1 and the cover plate 6.

The bore 3 has an internal shoulder 9 adjacent its inner end, and an annular valve seat 10 is disposed in the bore 3 adjacent the shoulder 9. A valve 11, which engages the seat 10, is connected to one end of a stem 12, which is connected at its opposite end to a piston 13. The piston 13 is disposed in the bore 5, and is movable therein in response to fluid pressure as hereinafter described. Sealing means comprising a resilient O ring 14 is disposed in a peripheral groove provided therefor in the piston 13. The under side of the piston 13 is acted upon by a compression spring 15 whereby the valve 11 is normally seated. The compression spring 15 surrounds the stem 12 and is supported at its lower end by a spider-like spring seat 16. The spring seat 16 surrounds the stem 12, and its peripheral edge engages an internal shoulder 17 which is formed in the bore 5 adjacent its inner end.

A fluid passage 18, which is closed by a plug 19, is formed in the body member 1 adjacent its flanged lower end, and extends horizontally from the periphery of the flange to the interior of the bore 3. A fluid passage 20, which is closed by a plug 21, is formed in the cover plate 6, and extends horizontally from the periphery of the plate 6 to the center thereof, where it joins a vertical fluid passage 22 which continues upwardly into the pilot valve as hereinafter described. A tubular conduit 23 is disposed externally with respect to the valve body 1 and is connected to the flanged upper and lower ends thereof. A fluid passage 24, which is formed in part by the tubular conduit 23, connects the fluid passages 18 and 20 adjacent their outer ends. A fluid passage 25, which continues upwardly into the pilot valve as hereinafter described, extends vertically through the cover plate 6 and communicates at its lower end with the interior of the bore 5.

A pilot valve as hereinafter described is connected to the cover plate 6 and extends upwardly therefrom. The pilot valve includes a vertically disposed cylindrical housing member 26, the ends of which are closed by a bottom adapter plate 27 and a dome shaped top closure 28. The pilot valve is connected to the cover plate 6 by a plurality of fastening devices such as the cap screw, shown in dotted lines, which extend upwardly from the under side of the cover plate 6, through the cover plate 27 and into the housing member 26. A gasket 29 is disposed between the housing member 26 and the bottom adapter plate 27, and a gasket 30 is disposed between the bottom cover plate 27 and the cover plate 6.

An internal caivty 31 is formed in the housing member 26 forming a fluid chamber 67 therein. An internal bore 32, which is of smaller diameter than the cavity 31, is formed in the upper end of the housing member 26 and communicates at its inner end with the cavity 31. The bore 32 is threaded beginning at its inner end. A sleeve 33 is disposed partly in the bore 32 and extends downwardly into the cavity 31, the lower end of the sleeve 33 approaching the lower extremity of the cavity 31. Sealing means comprising a resilient O ring 34 is disposed in an annular groove provided therefor in the peripheral wall of the sleeve 33 adjacent its upper end. The sleeve 33 is threaded externally below the O ring 34 for engagement with the threaded portion of the bore 32.

A bore 35, which is of smaller diameter than the bore 32, is formed in the lower end of the housing member 26 and communicates at its inner end with the cavity 31. The bores 32 and 35 are aligned concentrically with each other and with the fluid passage 22, above referred to, which continues upwardly from the cover plate 6, through the adapter plate 27, and communicates at its upper end through pilot valve elements with the interior of the bore 35.

A bushing 36 is disposed partly in the sleeve 33 and extends downwardly therefrom, thru the cavity 31, into the bore 35. The bushing 36 has two external shoulders, numbered 37 and 38, positioned one above the other, whereby its diameter is successively reduced. The portion of the bushing 36 above its uppermost shoulder 37 is disposed in the lower end of the sleeve 33 and retained therein by a retaining ring 39, which is disposed in an annular groove provided therefor in the inner wall of the sleeve 33 adjacent its lower end. The sleeve 33 has an internal shoulder 40 for engagement by the upper end of the bushing 36. Sealing means comprising a resilient O ring 41 is disposed in an annular groove provided therefor in the peripheral wall of the bushing 36 adjacent its upper end. A portion of the bushing 36 spaced downwardly from its uppermost shoulder 37, and including portions thereof above and below its lowermost shoulder 38, is disposed in the bore 35. Sealing means comprising a resilient O ring 42 is disposed in an annular groove provided therefor in the peripheral wall of the bushing 36 between the shoulders 37 and 38.

An annular valve seat member 43 is disposed in the lower end of the bore 35, adjacent the adapter plate 27 and in alignment with the fluid passage 22. Sealing means comprising a resilient O ring 44 is disposed in an annular groove provided therefor in the under side of the valve seat 43. The valve seat member 43 has an external shoulder 45 intermediate its ends, and its upper end is of smaller diameter than its lower end. The diameter of the lower end of the valve seat member 43 corresponds to that of the lower end of the bushing 36. The upper end of the valve seat member 43 is disposed in an internal bore 46 which is formed in the bushing 36 beginning at its lower end.

The valve seat member 43 has a bore 43' therethrough, and an upper end face 45' forming a valve seat and which is provided with an annular groove 46' surrounding the bore 43' in radially spaced relation thereto.

The upper extremity of the bore 46 is spaced above the valve seat member 43, and is positioned at an elevation below that of the lowermost shoulder 38 of the bushing 36. A bore 47, which is of smaller diameter than the bore 46, is formed in the bushing 35 beginning at the upper extremity of the bore 46 and continuing upwardly to an elevation corresponding to that of the uppermost shoulder 37. A valve stem 48 is disposed partly in the bore 46 and partly in the bore 47. An internal bore 49, formed in the lower end of the valve stem 48, provides a socket for a valve disc 50, which is disposed therein. The valve stem 48 is movable longitudinally with respect to the bore 47. The upper extremity of the bore 49 normally engages the upper side of the valve disc 50, while the portion of the valve stem 48 surrounding the bore 49 normally closely approaches the valve seat member 43, concurrently with engagement of the valve disc 50.

A bore 51, which is of smaller diameter than the bore 47, is formed in the bushing 36 beginning at the upper extremity of the bore 47 and extending upwardly thru the upper end of the bushing 36. A valve stem 52, which has an enlarged lower end 53, is disposed partly in the bore 47, above the valve stem 48, and extends upwardly therefrom, thru the bore 51, above the upper end of the bushing 36. The valve stem 52 is movable longitudinally with respect to the bores 47 and 51, and with the valve stem 48. The lower end of the valve stem 52 normally engages the upper end of the valve stem 48.

A compression spring 54, having an upper seat 55 and a lower seat 56, is disposed in the sleeve 33 above the bushing 36. An elongated spindle 57, which is disposed vertically in alignment with the valve stem 52, engages the upper end of the valve stem 52 and extends upwardly therefrom thru openings formed in the spring seats 55 and 56. The spindle 57 has an enlarged lower end 58 having a socket 59 in its under side for engagement by the upper end of the valve stem 52 and a beveled peripheral edge for engagement with the under side of the lower seat 56.

The upper end of the sleeve 33 is closed except for a number of small vents 60 which may be positioned to receive suitable means such as a spanner wrench by which the sleeve 33 may be threaded into place. A corresponding vent 61 is formed in the top closure 28. A hollow screw 62, which surrounds the spindle 57 and is disposed in a threaded opening 63 formed in the upper end of the sleeve 33, engages the upper seat 55 whereby the compression of the spring 54 may be adjusted. A lock nut 64 is applied to the screw 62 above the upper end of the sleeve 33.

A fluid chamber 65 is provided in the annulus surrounding the valve seat 43 and the portion of the bushing 36 below its lowermost shoulder 38. A horizontal fluid passage 66, which is formed in the bushing 36, is positioned at an elevation corresponding to that of the opposed surface of the valve seat 43 and the valve disc 50. The fluid passage 66 communicates at its ends with the fluid chamber 65 and with the interior of the bore 56. The fluid chamber 65 is in fluid communication with the fluid passage 25, which continues upwardly from the cover plate 6, thru the adapter plate 27.

A fluid chamber, which is a part of the chamber 31, is provided in the annulus surrounding the sleeve 33. A horizontal fluid passage 68, which is formed in the bushing 36 below its uppermost shoulder 37, is positioned at an elevation to expose the upper surface of the valve stem 48. The fluid passage 68 communicates at its ends with the fluid chamber 67 and with the interior of the bore 47.

A horizontally disposed tubular member 69 is disposed partly in a horizontal bore 70 formed in one side of the housing member 26, and extends outwardly therefrom. The bore 70 extends inwardly from the periphery of the housing member 26, and communicates at its inner end with the fluid chamber 65. The bore 70 is internally threaded for engagement by the inner end of the tubular member 69, which is externally threaded. An elongated fluid chamber 71 is provided in the inner end of the tubular member 69, the fluid chamber 71 having restricted orifices 72 and 73, each of which is of predetermined size, at its inner and outer ends. The size of the orifice 72 is determined by selection, while the flow thru the orifice 73 is capable of adjustment by means of a hollow screw 74, which is disposed in the outer end of the tubular member 69. The outer end of the tubular member 69 is internally threaded for engagement by the screw 74. A lock nut 74 is applied to the outer end of the screw 74. A restricted orifice 76 is formed in the wall of the tubular member 69, between the orifices 72 and 73, whereby the fluid chamber 71 is in fluid communication with a vertical fluid passage 77, which is formed in the housing member 26 and communicates at its ends with the bore 70 and with the fluid chamber 67. The orifice 76 may be smaller than either of the orifices 72 and 73. The tubular member 69 also has an internal restriction of predetermined size forming an orifice 76' located mediate the orifices 72 and 73. Sealing means comprising a resilient O ring 78 is disposed in an annular groove provided therefor in the peripheral wall of the tubular member 69, between the orifice 76 and the periphery of the housing member 26.

In operation, the main valve and the pilot valve are each set in closed position, as shown in Figs. 1 and 2. Line pressure is applied to the pilot valve from the interior of the bore 3, which comprises the inlet of the main valve, thru the fluid passage 18 and the connecting passages 24, 20 and 22. The valve disc 50 remains seated until the upward force exerted by the applied line pressure is sufficient to overcome the downward force exerted by the spring 54.

Fluid acts upwardly in the bore 43' against the bottom of the valve disc 50 in the area defined by the bore, until the fluid pressure becomes equal to the unit bearing pressure exerted by the valve disc in the area defined by the bore 43' and the inner wall of the groove 46', whereupon leakage will occur between the valve disc and valve seat and fluid pressure may then act on the valve stem 48 throughout the area defined by the bore 47 to quickly move the valve elements 48 and 50 to open position.

When sufficient pressure is applied to the under side of the valve disc 50, the valve disc 50 is lifted slightly, and inturn lifts the valve stem 48. Fluid then passes upwardly thru the valve seat 43, below the valve disc 50 and the annular portion of the valve stem 48 surrounding the bore 49. Pressure builds up in the annular fluid chamber 65 and the fluid passages communicating therewith, including the fluid passage 25, which communicates at its lower end with the interior of the bore 5 above the piston 13. As pressure is built up in the fluid chamber 65 and the connecting passages, it exerts an upward force which, acting on the area described by the valve stem 48, multiplies the initial upward force by the ratio of the area of the stem 48 compared to that of the bore through the valve seat. When the spring force is exceeded by the aforementioned multiplied upward force, then the pilot valve snaps into opened position and line pressure is applied to the main valve to open it.

As pressure builds up in the annular fluid chamber 65, a somewhat lower pressure, which is a function of the size of the restricted orifices 72, 76' and 73 and the setting of the hollow screw 74, builds up in the elongated fluid chamber 71. The fluid accumulating in the fluid chamber 71 passes, thru the restricted orifice 76 and the fluid passage 77, to the fluid chamber 67 formed by the cavity 31. Pressure gradually builds up in the fluid chamber 67 and in the connecting fluid passage 68. As pressure builds up in the fluid chamber 67 and the fluid passage 68, it exerts a force which, acting on the upper end of the valve stem 48 and the lower end of the valve stem 52, supplements the downward force exerted by the spring 54. As the line pressure is reduced, the upward and downward forces each are reduced, however at different rates. The difference in the rates determines the line pressure reduction necessary to reach an equilibrium of forces. When the combined downward force is sufficient to overcome the combined upward force, each as above described, the pilot valve is fully closed and the main valve likewise is closed. There is a time lag, due to the small size of the restricted orifice 76, so that pressure is maintained in the fluid chamber 67 for a time interval sufficient to insure positive seating of the valve disc 50.

An outstanding feature of the invention resides in the flow control mechanism by which the rate of decreases of the downward forces is controlled. This is accomplished by the adjustment of the hollow screw 74. By this arrangement the efficiency of flow of fluid between the orifice 73 and the orifice of the hollow screw 74 may be altered by adjusting the position of the screw, the device thus providing a means whereby the rate of flow may be very accurately controlled, consequently providing a means for adjustment of the ratio of line pressure to that of the pressure in chamber 67, which in turn determines the differential between the opening and closing line pressures of the valve. By making the orifices of substantially the same size, the amount of movement of the screw 74 required to accomplish a relatively small change in the rate of flow will be large, thus permitting accurate control of the rate of flow. This arrangement not only makes possible the more accurate adjustment of the rate of flow, but due to the unobstructed, circular shape of the orifices, reduces the likelihood of clogging, thus presenting a distinct advantage over flow control mechanism of conventional design such as a needle valve.

The invention may be modified in various ways without departing from the spirit and scope thereof.

I claim:

1. In a pressure actuated valve assembly, the combination with a valve housing having an inlet and an outlet and a flowway in communication with the inlet and outlet, means forming an annular valve seat in the housing in surrounding relation to the flowway, said housing having a bore located above and in axial alignment with the seat and whose lower end is in communication with said outlet, a main valve movably disposed in the housing for movement into and out of closing contact with the seat, a valve stem on the main valve extending into said bore, a piston movably disposed in the bore and connected to said stem to urge the stem in a direction to close the main valve under the influence of the pressure of fluid in said outlet, of means for yieldingly resisting the movement of said piston in a direction to close the main valve comprising, means closing the upper end of said bore and forming a pressure chamber exteriorly of the housing, means forming a passageway through which fluid may flow between said chamber and the upper end of said bore, means forming an inlet passageway through which fluid may flow from said inlet into said chamber, a pilot valve positioned to be opened and closed to control the flow of fluid through said inlet passageway, means for causing said pilot valve to close when the pressure in said inlet passageway falls to a predetermined pressure below the pressure in said chamber and to allow the pilot valve to be opened by the pressure of fluid in the inlet passageway when the pressure in the inlet passageway exceeds said predetermined pressure, means forming a discharge passageway through which fluid may be exhausted from the chamber and from said bore, means for restricting the flow of fluid from said chamber to said discharge passageway and means for restricting the outflow of fluid from said discharge passageway to regulate the movement of said piston in a direction to close said main valve.

2. In a pressure actuated valve assembly, the combination with a valve housing having an inlet and an outlet and a flowway in communication with the inlet and outlet, means forming an annular valve seat in the housing in surrounding relation to the flowway, said housing having a bore located above and in axial alignment with the seat and whose lower end is in communication with said outlet, a main valve movably disposed in the housing for movement into and out of closing contact with the seat, a valve stem on the main valve extending into said bore, a piston movably disposed in the bore and connected to said stem to urge the stem in a direction to close the main valve under the influence of the pressure of fluid in said outlet, of means for yieldingly resisting the movement of said piston in a direction to close the main valve comprising, means closing the upper end of said bore and forming a pressure chamber exteriorly of the housing, means forming a passageway through which fluid may flow between said chamber and the upper end of said bore, means forming an inlet passageway through which fluid may flow from said inlet into said chamber, pilot valve positioned to be opened and closed to control the flow of fluid through said inlet passageway, means for causing said pilot valve to close when the pressure in said inlet passageway falls to a predetermined pressure below the pressure in said chamber and to allow the pilot valve to be opened by the pressure of fluid in the inlet passageway when the pressure in the inlet passageway exceeds said predetermined pressure, means forming a discharge passageway through which fluid may be exhausted from the chamber and from said bore, means for restricting the outflow of fluid from said chamber into said discharge passageway and means in the discharge passageway for restricting the outflow of fluid from the discharge passageway to regulate the movement of said piston in a direction to close said main valve.

3. In a pressure actuated valve assembly, the combination with a valve housing having an inlet and an outlet and a flowway in communication with the inlet and outlet, means forming an annular valve seat in the housing in surrounding relation to the flowway, said housing having a bore located above and in axial alignment with the seat and whose lower end is in communication with said outlet, a main valve movably disposed in the housing for movement into and out of closing contact with the seat, a valve stem on the main valve extending into said bore, a piston movably disposed in the bore and connected to said stem to urge the stem in a direction to close the main valve under the influence of the pressure of fluid in said outlet, of means for yieldingly resisting the movement of said piston in a direction to close the main valve comprising, means closing the upper end of said bore and forming a pressure chamber exteriorly of the housing, means forming a passageway through which fluid may flow between said chamber and the upper end of said bore, means forming an inlet passageway through which fluid may flow from said inlet into said chamber, a pilot valve positioned to be opened and closed to control the flow of fluid through said inlet passageway, means for causing said pilot valve to close when the pressure in said inlet passageway falls to a predetermined pressure below the pressure in said chamber and to allow the valve means to be opened by the pressure of fluid in the inlet passageway when the pressure in the inlet passageway exceeds said predetermined pressure, means forming a discharge passageway through which fluid may be exhausted from the chamber and from said bore, means for restricting the flow of fluid from the chamber to said discharge passageway and means for varying the rate of outflow of fluid from said discharge passageway to regulate the rate of closing movement of said main valve.

4. In a pressure actuated valve assembly, the combination with a valve housing having an inlet and an outlet and a flowway in communication with the inlet and outlet, means forming an annular valve seat in the housing in surrounding relation to the flowway, said housing having a bore located above and in axial alignment with the seat and whose lower end is in communication with said outlet, a main valve movably disposed in the housing for movement into and out of closing contact with the seat, a valve stem on the main valve extending into said bore, a piston movably disposed in the bore and connected to said stem to urge the stem in a direction to close the main valve under the influence of the pressure of fluid in said outlet, of means for yieldingly resisting the movement of said piston in a direction to close the main valve comprising, means closing the upper end of said bore and forming a pressure chamber exteriorly of the housing, means forming a passageway through which fluid may flow between said chamber and the upper end of said bore, means forming an inlet passageway through which fluid may flow from said inlet into said chamber, a pilot valve positioned to be opened and closed to control the flow of fluid through said inlet passageway, means for causing said pilot valve to close when the pressure in said inlet passageway falls to a predetermined pressure below the pressure in said chamber and to allow the pilot valve to be opened by the pressure of fluid in the inlet passageway when such pressure exceeds said predetermined pressure, means forming a discharge passageway through which fluid may be exhausted from the chamber and from said bore, means for restricting the outflow of fluid from said chamber and from said bore into said discharge passageway and means for varying the rate of outflow of fluid from said discharge passageway to regulate the rate of movement of the piston in a direction to close the main valve, said last named means including a stationary orifice in said discharge passageway and orifice means movably positioned in the passageway for movement toward and away from said stationary orifice.

References Cited in the file of this patent
UNITED STATES PATENTS

| | | |
|---|---|---|
| 1,291,497 | Harris | Jan. 14, 1919 |
| 1,871,287 | Whittaker | Aug. 9, 1932 |
| 1,882,062 | Campbell | Oct. 11, 1932 |
| 1,972,435 | Ackermann | Sept. 4, 1934 |
| 2,408,708 | Tweedle | Oct. 1, 1946 |
| 2,487,418 | Birkemeier | Nov. 8, 1949 |
| 2,552,892 | Garrett | May 15, 1951 |
| 2,680,453 | Prijatel | June 8, 1954 |
| 2,754,842 | Hagiwara | July 17, 1956 |